Figure 1:
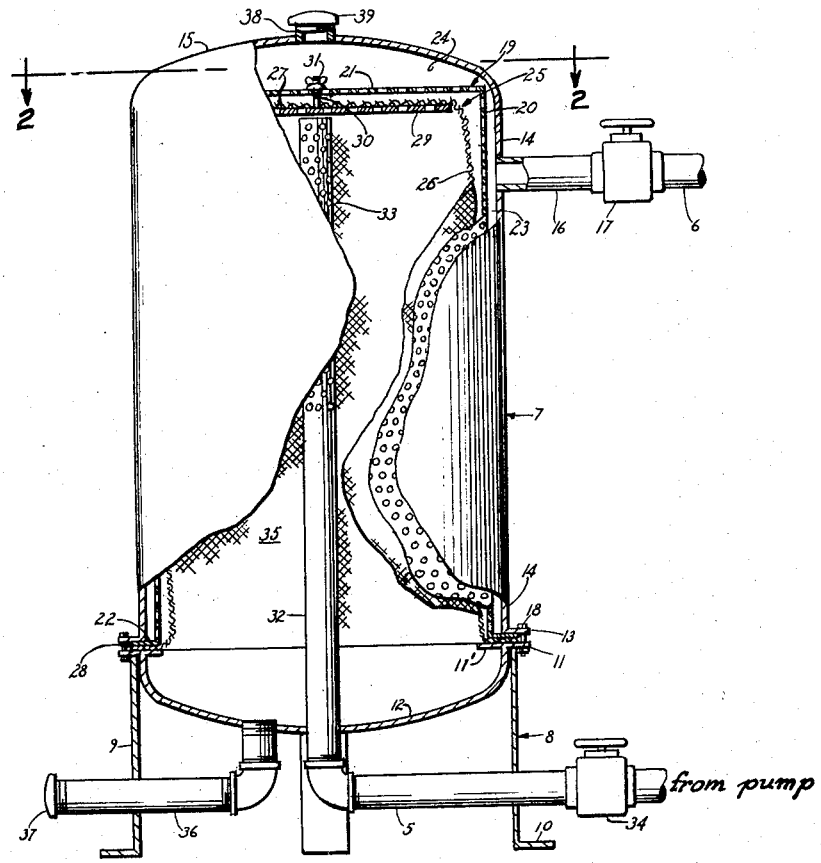
Figure 2:
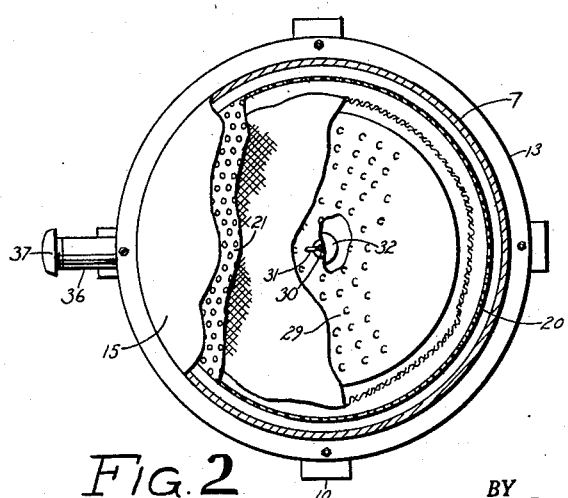

Sept. 9, 1958 J. MORINO 2,851,164
SWIMMING POOL FILTER TANK
Filed Feb. 17, 1956

INVENTOR.
JOHN MORINO
BY
Sellers and Latta
-ATTORNEYSthough spaced from said bag, said cage including a cylindrical lateral wall of perforated sheet material, a perforated head closing its upper end, and a mounting flange projecting outwardly at its lower end and clamped between said casing flange and said bag flange; a nozzle tube mounted in said sump and projecting upwardly into said bag, said tube being closed at its upper end and having a multiplicity of apertures in its upper end portion, the lower end of said tube projecting downwardly from said sump; a water supply conduit connected to the lower end of said tube; a water return conduit communicating with said casing below said cage head and above said bag flange; and a scavenging outlet communicating with said sump.

2. A filtering apparatus as defined in claim 1, said casing having a dome at its upper end, projecting above said cage head and defining with said cage head a head space; said casing having also a vent opening communicating with said head space and means for selectively closing said vent opening.

References Cited in the file of this patent

UNITED STATES PATENTS

| 711,810 | Stickney | Oct. 21, 1902 |
| 1,120,629 | Martin | Dec. 8, 1914 |
| 1,620,839 | Heftler | Mar. 15, 1927 |
| 1,685,118 | Schmidt | Sept. 25, 1928 |
| 2,057,219 | Thompson | Oct. 13, 1936 |
| 2,197,971 | Beach | Apr. 23, 1940 |
| 2,300,789 | Lannert | Nov. 3, 1942 |
| 2,374,094 | Briggs | Apr. 17, 1945 |
| 2,562,730 | Booth | July 31, 1951 |
| 2,720,314 | Thompson | Oct. 11, 1955 |

FOREIGN PATENTS

| 125,024 | Australia | June 29, 1947 | supporting said bag, said cage including a lateral wall member in closely spaced relation to the inner wall of the casing and including a top member and an open lower end provided with a rim flange clamped between said bag flange and said casing; an apertured disc within said bag, engaged beneath the top portion thereof to support the bag and having a stud attached to its center and projecting upwardly through said top portion of the bag and through said upper end member of the cage and attached to the latter; a nozzle tube extending through said sump and rising in said chamber to a point near the top thereof, said nozzle tube having a plurality of nozzle apertures through which jets may be directed laterally into said chamber; a service outlet communicating with said casing for carrying filtered water away from the apparatus; a scavenging outlet communicating with said sump for carrying away collected refuse from said chamber when said scavenging outlet is open and said service outlet is closed; closure means normally closing said scavenging outlet; and means for closing said service outlet to direct scavenging flow to said scavenging outlet when said closure means is opened.

2. In a swimming pool filtering apparatus: a base including supporting means and a waste collection sump carried thereby; an imperforate casing having an open lower end provided with an external radial flange attached to said base; a filter bag in said casing in an inverted position, said bag having an open lower end provided with a rim flange clamped between said sump and said casing flange and having a closed upper end; an aperture cage within said casing and surrounding and supporting said bag, said cage including a lateral wall member in closely spaced relation to the inner wall of the casing and including a top member and an open lower end provided with a rim flange clamped between said bag flange and said casing; an apertured disc within said bag, engaged beneath the top portion thereof to support the bag and having a stud attached to its center and projecting upwardly through said top portion of the bag and through said upper end member of the cage and attached to the latter; an inlet communicating with said sump for delivering water thereto; a service outlet communicating with said casing for carrying filtered water away from the apparatus; scavenging outlet communicating with said sump for carrying away collected refuse from said chamber when said scavenging outlet is open and said service outlet is closed; closure means normally closing said scavenging outlet; and means for closing said service outlet to direct scavenging flow to said scavenging outlet when said closure means is opened.

References Cited in the file of this patent

UNITED STATES PATENTS

| | | |
|---|---|---|
| 1,453,310 | Engel | May 1, 1923 |
| 1,585,246 | Hoy | May 18, 1926 |

FOREIGN PATENTS

| | | |
|---|---|---|
| 346,094 | France | Nov. 11, 1904 |
| 351,304 | France | May 3, 1905 |